United States Patent [19]
Chen et al.

[11] Patent Number: 5,664,198
[45] Date of Patent: Sep. 2, 1997

[54] HIGH SPEED ACCESS TO PC CARD MEMORY USING INTERRUPTS

[75] Inventors: Chengwu Chen; Michael E. Pierce; James L. Foote, III, all of Sacramento, Calif.

[73] Assignee: Intel Corporation, Santa Clara, Calif.

[21] Appl. No.: 329,230

[22] Filed: Oct. 26, 1994

[51] Int. Cl.⁶ .......................... G06F 13/14; G06F 13/00
[52] U.S. Cl. ..................... 395/733; 395/651; 395/652
[58] Field of Search ........................ 395/733, 735, 395/775, 280, 375, 311, 846, 651, 652, 309, 427, 828

[56] References Cited

U.S. PATENT DOCUMENTS

| | | | |
|---|---|---|---|
| 3,771,136 | 11/1973 | Heneghan et al. | 395/775 |
| 4,296,466 | 10/1981 | Guyer et al. | 395/846 |
| 4,941,087 | 7/1990 | Kap | 395/733 |
| 5,142,683 | 8/1992 | Burkhardt | 395/733 |
| 5,257,387 | 10/1993 | Richek et al. | 395/800 |
| 5,269,015 | 12/1993 | Shires | 395/421.01 |
| 5,319,751 | 6/1994 | Garney | 395/650 |
| 5,319,767 | 6/1994 | Lau, Jr. et al. | 395/280 |
| 5,373,467 | 12/1994 | Wang | 365/189.02 |
| 5,426,769 | 6/1995 | Pawloski | 395/500 |
| 5,455,572 | 10/1995 | Cannon et al. | 340/825.44 |
| 5,475,846 | 12/1995 | Moore | 395/733 |
| 5,537,558 | 7/1996 | Fletcher et al. | 395/309 |
| 5,537,654 | 7/1996 | Bedingfield et al. | 395/834 |
| 5,562,504 | 10/1996 | Moshayedi | 439/638 |
| 5,568,134 | 10/1996 | Cannon et al. | 340/825.44 |

Primary Examiner—Gopal C. Ray
Attorney, Agent, or Firm—Blakely, Sokoloff, Taylor & Zafman

[57] ABSTRACT

A system for accessing attribute memory on a card using the interrupt capability of a microcontroller on the PCMCIA card intended to perform I/O functions for the host. The attribute memory interfaces directly with the microcontroller. A PLD is connected between the host bus and the microcontroller decodes the host's bus signals and generates an interrupt signal when it detects a request for access to the attribute memory which signal is supplied to the microcontroller. Upon receipt of the interrupt signal, the microcontroller runs a special routine that accesses attribute memory and supplies the results to the host. The PCMCIA card has a configured state in which the host has read the configuration information from attribute memory and has allocated necessary system resources. The PCMCIA card is in an unconfigured state if the foregoing has not been accomplished. The programmable logic device contains an AND gate having one of its inputs connected to the lines of the bus relating to the I/O function and a second input connected to the microprocessor for receiving a card enable signal, having at least two logic states. The control signals are passed to the microcontroller when the card enable signal is in one of the two logic states. The method consists of the steps of decoding the bus signals; when the host requests access to attribute memory, generate an interrupt signal and supply it to the microcontroller; the microcontroller runs an interrupt routine that includes saving the microcontroller registers, disabling the I/O functions, accessing the attribute memory, and providing the results to the host.

8 Claims, 8 Drawing Sheets

HIGH SPEED ACCESS TO PC CARD MEMORY USING INTERRUPTS

BACKGROUND OF THE INVENTION

1. Field of the Invention

The subject invention relates to printed circuit cards for add in I/O functions for computer systems. More particularly, the invention relates to accessing memory on the printed circuit cards at any time through use of an interrupt.

2. Description of the Prior Art

The PCMCIA (Personal Computer Memory Card International Association) standard was developed for the purpose of providing user installed memory and I/O functions for small form factor digital computer systems. The standard specifies a card containing a printed circuit board. This product is usually referred to as a PC card. There are three PC card formats: Types I, II and III. The standard specifies the interface between the PC card and the host. The hardware portion of the interface consists of a 68 position socket on one end of the card. The 68 position socket mates with a 68 position plug mounted on a header which is in turn mounted to a mother board or daughter board which is located inside the host. In addition to the hardware interface, the PCMCIA standard also specifies the signal timing protocol. In the PC card, the protocol was originally implemented by wiring up over 1000 logic gates. This however was expensive.

The original Type I PC cards were intended to provide additional memory. No interaction with external devices was contemplated. Later, a PCMCIA specification for a type II card was developed which provided for I/O functionality such as modems, facsimile, network interfaces, multi-media interface, sound cards, etc. In order to handle I/O functions, a second connector is located on the end of the card opposite the 68 position socket.

Because type II cards with several different types of functionality may be inserted into the type II PC card slot on a host computer, the PCMCIA standard establishes a procedure for the host to identify and adapt to the different types of cards. To start with the PCMCIA standard breaks the microcontroller memory into three separate spaces: attribute memory space, common memory space and I/O memory space. Each memory space uses the same set of 25 address lines but different sets of control signals. Thus, there is an attribute memory address 1, a common memory address 1, an I/O address 1, etc. Each is reached with the same signals on the address bus, but different signals on the control bus. In the host, certain segments of host memory are mapped to the three memory spaces on the card. The PCMCIA standard further specifies that any access to any memory must be completed within a 12 microsecond window. So for example, reading of one byte of information from the card must be completed in 12 microseconds or less.

The information that specifies the card is stored in an area called a configuration information structure ("CIS") which starts at address 0 in attribute memory space. This information includes everything that the host needs to know about the card to allocate system resources such as com ports, memory, IRQ levels, etc. and otherwise configure various registers both in the host and on the card to work with the card. Among the additional resources that the host may allocate based on the CIS information are common memory, I/O space or both. This process in known as configuring the system for the PCMCIA card. Until the host performs the configuration function, the card is useless. Indeed, the PCMCIA standard does not allow the host to access any area of a PC card other than the CIS information until the configuration process is complete. Thus, there are two states in which a PC card may be: configured and un-configured.

To reduce the cost of the logic required to perform the PCMCIA protocol, manufacturers substituted a microcontroller, its associated software and a small amount of additional hard wired logic, often in the form of a programmable logic device ("PLD"), to emulate the PCMCIA interface protocol. With this approach, most of the functionality of the old protocol logic gates was moved to the microcontroller. The microcontroller would toggle signals at the appropriate times to emulate the PCMCIA protocol timing specification.

When a card is un-configured, the microcontroller is mainly idling. In this condition, it is easy to make a memory access within the 12 micro second time specified by the PCMCIA standard. However, once the card has been configured and is handling I/O requests, the microcontroller is very busy performing its protocol emulation duties. Under these conditions, standard software access techniques such as polling are not able to access PC card memory in the prescribed 12 microseconds.

Because of this, prior art systems that use a microcontroller to emulate the interface protocol signal timing do not allow access to the CIS after the card has been configured. However, there are good reasons for having the CIS information available to the host at all times.

Software that is executing on the host sometimes requires this information at later times. This is particularly true when the host is executing several programs simultaneously.

OBJECTS AND SUMMARY OF THE INVENTION

It is therefore an object of the invention to provide a system that allows the host to access the CIS information on a type II add in PC card at any time after the card has been inserted into the host.

It is another object of the invention to provide a system that allows the host to access the CIS information on a type II PC card either before or after the card has been configured.

These and other objects of the invention are achieved in a system for accessing attribute memory located on an add-in PC card. The attribute memory interfaces directly with a microcontroller also located on the PC card. The PC card operates within a host computer which includes a bus having address, data and control lines, and a microprocessor that supports interrupts. A programmable logic device is connected between the host bus and the microcontroller. The programmable logic device decodes the host's bus signals and generates an interrupt when it detects that the host has requested access to the attribute memory located on the PC card. The microcontroller then runs an interrupt routine that accesses attribute memory and supplies the results to the host. The interrupt is preferably a non-maskable interrupt although maskable interrupt is an alternative. The PC card may conform to the PCMCIA standard in which case configuration information is contained in the attribute memory. The PC card is intended to perform at least one I/O or memory function and has a configured state in which the host has read the configuration information from attribute memory and has allocated all system resources necessary to perform the function. The PC card also has an unconfigured state in which the foregoing has not been accomplished.

The system is further characterized by means connected between the bus and the microcontroller for disconnecting all functions of the PC card from the host for so long as the card is in the unconfigured state. This may be accomplished by a logic device such as an AND gate having one of its inputs connected to the lines of the bus relating to the I/O function and as a second input connected to the microprocessor for receiving a card enable signal, called a CEN, having at least two logic states. The control signals are passed to the microcontroller when the CEN signal is in a first state and are not passed to the microcontroller when the CEN signal is in other than the first state. The logic device may be in the programmable logic device. The bus signals to be decoded are the control signals.

The invention also encompasses a method of accessing the attribute memory. Upon reset or power up, the PC card is in the unconfigured state and the I/O functions are disconnected. From this point the method begins and includes the steps of first decoding the bus signals to determine when the host has made a request for access to attribute memory. Upon decoding such a request, an interrupt signal is generated and supplied to the microcontroller. The next step is to run the interrupt routine. The next step is to save the microcontroller registers. The next step is to perform the access to attribute memory requested by the host and provide the results to the host. The next step is to determine if the system has been configured. If yes, the next step is to set a software flag to reflect the fact that the system has been configured. If no, continue to determine if the system has been configured. Once determined that the system has been configured, connect the I/O function of the PC card to the host and restore the microcontroller registers back to their original state. Finally, return control of the microcontroller to the location in code from which it was taken upon the occurrence of the interrupt.

BRIEF DESCRIPTION OF THE DRAWING

The invention will be more fully described in connection with the Drawing wherein.

DESCRIPTION OF THE PREFERRED EMBODIMENT

Figure 1:
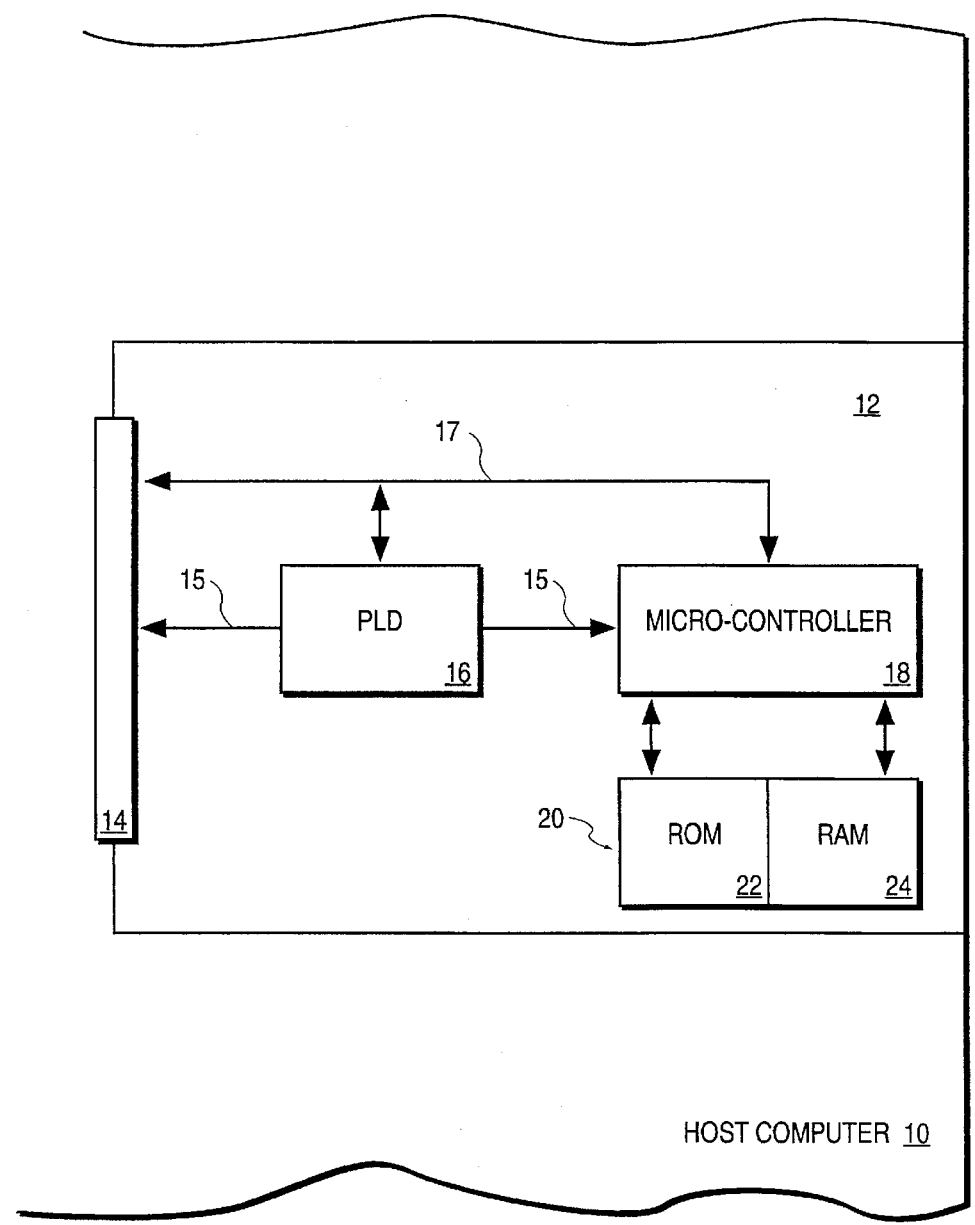
FIG. 1 is a block diagram of a prior art system.
Figure 2:
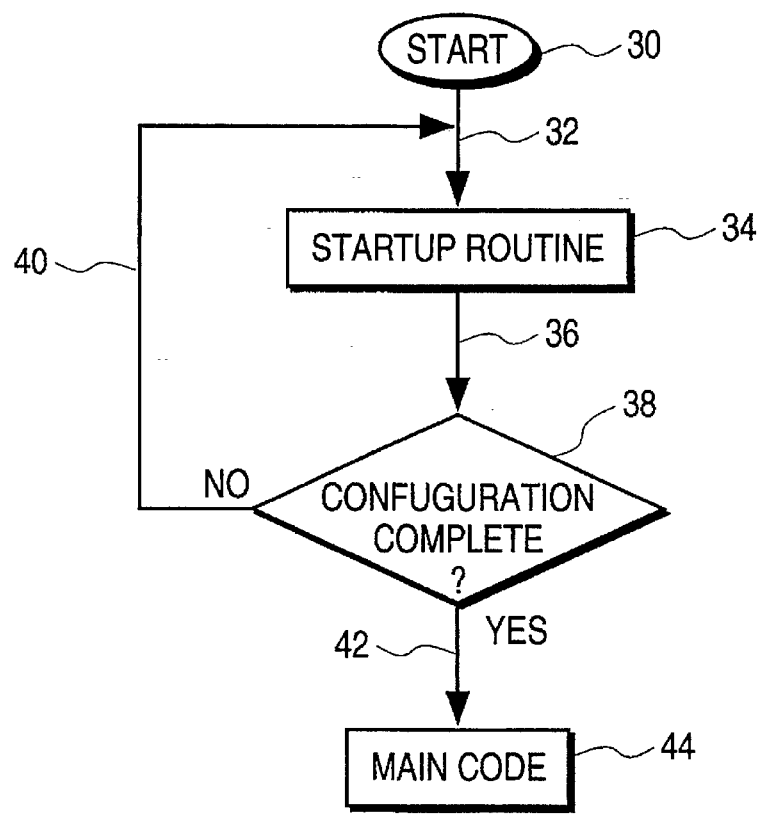
FIG. 2 is a simplified flow chart of the operation of a prior art PC card.

Before describing the preferred embodiment, it is helpful to briefly describe the prior art with the aid of FIGS. 1 and 2. FIG. 1 is a schematic representation of the hardware of the prior art. Referring now to FIG. 1, a host computer 10 contains a type II PCMCIA card 12. A 68 pin connector 14 defined in the PCMCIA standard provides the mechanical interface between host 10 and card 12. Control bus 15 connects the host 10 with PLD 16 and PLD 16 with microcontroller 18. Signal bus 17 connects host 10 with PLD 16 and microcontroller 18. Signal bus 17 includes a 25 bit address bus, a 16 bit data bus and control bits. The signal protocol for the host/card interface is provided on the card side by PLD 16 and and microcontroller 18. Microcontroller 18 works with memory section 20 which is divided into read only memory 22 and RAM 24. Most of the functionality needed to perform the PCMCIA standard protocol is resident in the operation of microcontroller 18 responding to programs located in memory 20. Some additional protocol functions are performed by PLD 16. Microcontroller 18 with its associated memory 20 also perform the basic functionality of the card such as modem or LAN communication functions. Thus microcontroller 18 is kept quite busy handling the PCMCIA interface protocol tasks as well as the basic functional tasks.

FIG. 2 is a simplified flow chart of the process by which the prior art accesses the CIS information. Referring now to FIG. 2, symbol 30 labeled start indicates the point at which a card is inserted into a host computer, or the point at which the host is powered up if a card is already inserted or if a card is reset. Process path 32 leads to processing block 34 labeled startup routine. This routine includes such things as setting on-card registers, memory, and other devices to default conditions. In addition processing block 34 includes the PC card configuration process data request. This is accomplished by the host computer requesting the CIS information. Next, host computer 10 allocates resources and configures various registers in the PC card indicating that the card has been configured. The process then exits startup routine 34 and follows processing path 36 to decision block 38 which tests to see if the configuration process is complete as indicated by a flag being set. If the configuration process is not complete, the method follows process path 40 back to startup routine 34 and repeats. Based on the flow chart of FIG. 2, it would seem that a test for the completion of configuration would not be necessary since it would by definition be completed when the program exited the start up routine of process block 34. However, the code for the process shown in FIG. 2, is located in the card, and much of the configuration work is done by the host and does not involve any aspect of the PC card. Examples of this would be assigning com ports and setting IRQ priorities. In addition, the host is performing many tasks in addition to supervising the startup routine in FIG. 2. Thus, part way through the startup routine, the host may branch to a different task and return at a later time.

If at decision block 38 the configuration is complete as determined by the host writing to COR, the operation of the card follows process path 42 to the main code section 44. Main code indicates that the PC card is now performing the functions for which the user installed the card such as a modem, network interface or multimedia interface. Note that once the routine of FIG. 2 is operating in the main code area, there is no way to branch back to the startup routine, and it is only in the startup routine that the CIS information is accessible. This is true because from the main code area, it is impossible within the time allowed by the PCMCIA standard to access the control lines and it is the control lines that determine which of the three memory areas, attribute, common or I/O that is addressed. It is not possible to affect the control lines from the main code area because the time allowed for action is defined to be very short by the PCMCIA standard. Polling methods require too much system time for it to operate and still be able to function as a modem.

To test decision block 38, the prior art uses a software routine called polling. Polling may be defined as a process of interrogating a particular register or memory location on a periodic basis. The problem with this technique is that it consumes a great deal of time. It is slow because polling can only be accomplished at times between other modem operations. For so long as PC card 10 is un-configured, microcontroller 18 is not very busy. During this period the use of the polling technique is fast enough to access memory within the 12 microsecond time constraint required by the PCMCIA standard. However, once the PC card is configured, the microcontroller will be very busy. In this environment, polling cannot access the CIS within the 12 microsecond window.

A key element of the present invention is the use of the interrupt capability of the microcontroller to gain access to the CIS information at any time. Most micro processors have two types of interrupts called maskable and non-maskable.

Most microcontroller have connections for two types of hardware interrupts. The standard interrupt usually referred to as ("INT") is under software control. The other, usually called the non-maskable interrupt ("NMI") cannot be disabled by software. The NMI is usually used to report serious problems to the CPU which often result in shutting the system down. The INT is used by peripherals to get action by the CPU.

The present invention may use either the NMI or the INT with a high priority.

Figure 3:
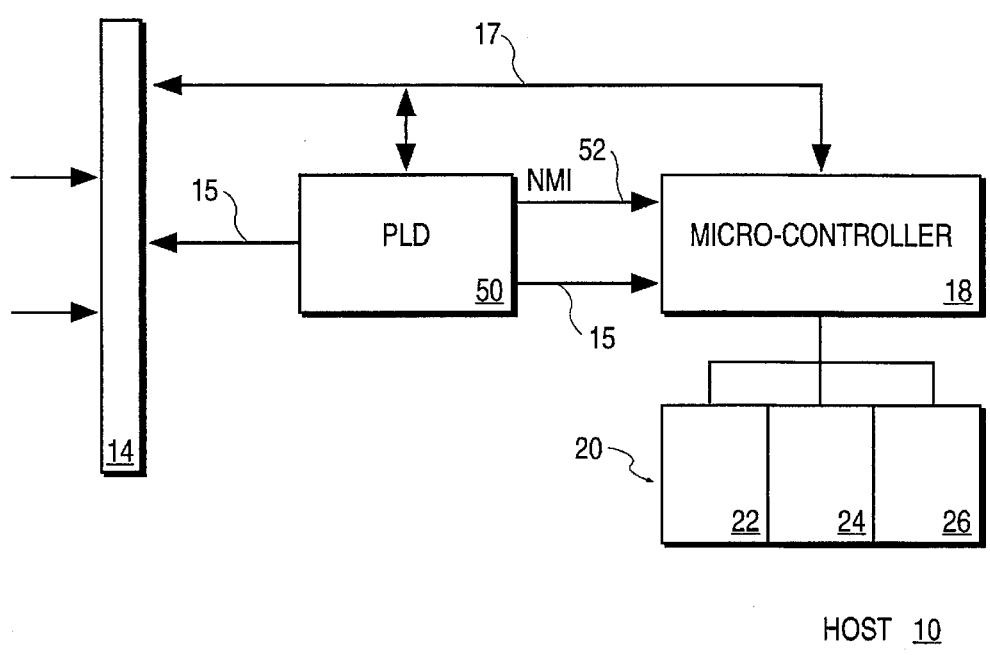
FIG. 3 is a simplified block diagram of the PC card architecture of the present invention.

FIG. 3 is a simplified block diagram of the architecture of the present invention. Referring now to FIG. 3, host 10, connector 14 and microcontroller 18 remain the same as in FIG. 1. PLD 50 is substantially but not exactly the same as PLD 16 of FIG. 1. The signal paths 15 and 17 by which the address, data and control signals pass from the host through connector 14 and the PLD remains the same. PLD 50 of FIG. 3 differs from PLD 16 of FIG. 1 in that within PLD 50 is a signal generator that generates a NMI signal and supplies it to microcontroller 18 via signal path 52 upon receiving a request from host 10 for access to the CIS. That is, PLD 50 contains certain decoding logic that detects a request from the host for access to the CIS information. Upon decoding such an event, the NMI signal is generated and supplied to microcontroller 18.

Figure 4:
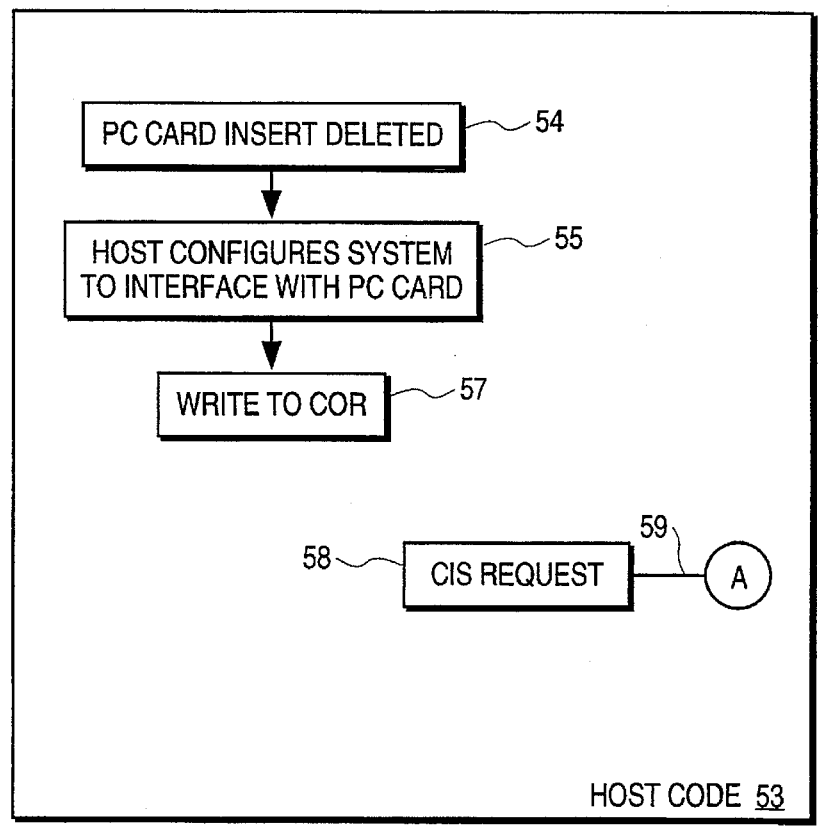
FIG. 4 is a simplified flow chart of the host microprocessor illustrating the method of operation of the architecture of FIG. 3 as regards accessing CIS information.

FIG. 4 is a simplified flow chart of the host microprocessor illustrating the method of operation of the architecture of FIG. 3 as regards accessing CIS information. Referring now to FIG. 4, if the host is up and running, it will be executing some code as illustrated by the block 53 labeled host code. When PC card 12 is inserted into the host, a pair of pins on the 68 pin connector 14 of FIG. 3 are shorted and thereby send a signal to the host that a PC card has been inserted. Part of the host code involves monitoring the PC card insert signals. This is illustrated by processing block 54. At this point, the host will either immediately allocate some time to the newly inserted PC card or schedule such time. When the host turns its attention to the newly inserted PC card, its first task is to configure the system so that the PC card may be used. This is illustrated by processing block 55. The host commences this process by accessing the CIS information. This information tells the host what kind of card has been inserted and where in the card's attribute memory to find additional information needed for proper interaction with this card. Part of the PC card configuration routine involves interaction with the PC Card and some involves the host only. The host microprocessor indicates that the configuration process is complete by writing a non-zero value to a register in PC card 12 called the configuration option register ("COR") as indicated by reference numeral 57. This register is located at attribute memory location 200h. The most significant bit of the COR must be set to a logical "1" and then be set to a logical "0" to perform a reset of the card. The CEN bit (bit 6) must then be set to a logical "1" to invoke modem functionality. After setting the COR, the host micro processor continues to execute host code. This code may or may not involve PC card 12.

Figure 5:
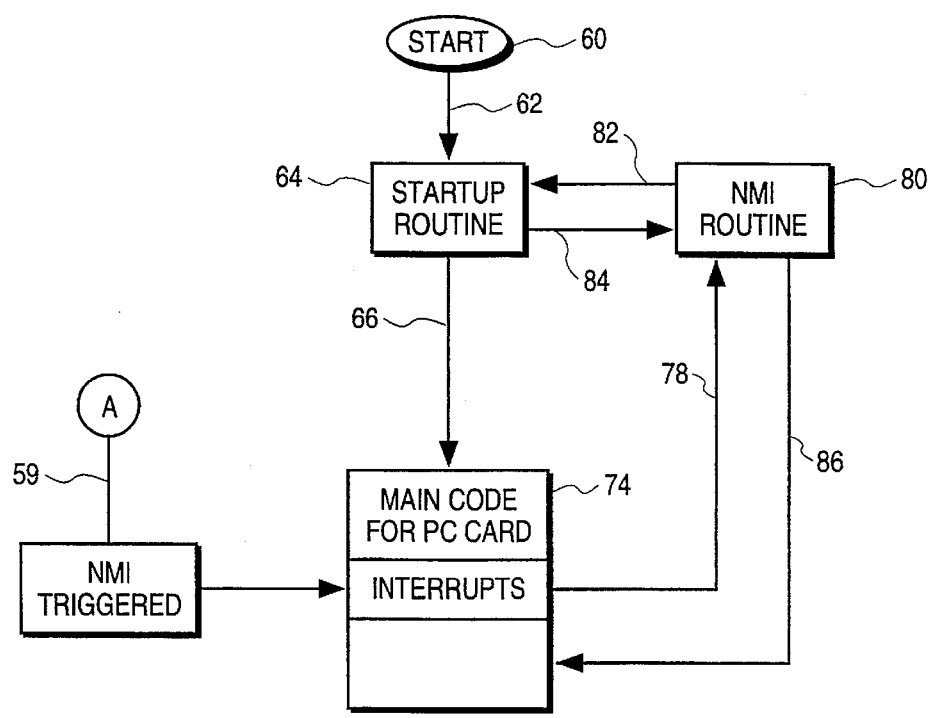
FIG. 5 is a flow chart of the microcontroller on the PC card.

FIG. 5 is a flow chart of the operation of microcontroller 18 on PC card 12. Referring now to FIG. 5, startup at reference numeral 60 indicates either that card 12 is then inserted into the host, or the card is in a powered down host and the host is then powered up or the PC card is reset by the host writing to the COR register. After start, follow process path 62 to processing block 64 labeled startup routine. The code that comprises the startup routine is located in read only memory 22 associated with microcontroller 18 in card 12. Startup routine 64 contains sections of code that provide access to the CIS information as well as other startup procedures. However, until the configuration routine is completed as indicated by setting the COR, microcontroller 18 disables access to I/O space. Thus, while in the unconfigured state, PC card 12 can act only as a memory card. From processing block 64, follow process path 66 to main code section 74 which is located in memory 20 on card 12. Once the microcontroller instruction pointer reaches main code 74, that code is executed and performs the functionality for which the PC card was intended, for example as a modem. However, for so long as the host does not configure the PC card by writing to the COR register, the PC card will not be able to perform its intended function.

Referring again to FIG. 4, when the host later needs to access the CIS information stored in PC card 12 as indicated by processing block 58, it runs a memory cycle. The address in the memory cycle is the appropriate one in attribute memory. In addition, the host's microprocessor puts the appropriate signals on control bus 15 such that attribute memory is reached. This cycle will involve interaction with PC card 12 which is illustrated by process path 59 leading to symbol A. Process path 59 is picked up in FIG. 5.

Referring now to FIG. 3, the address and control signals on the control bus are decoded by PLD 50. The PLD in turn generates a NMI signal and supplies it over signal path 52 to microcontroller 18. This signal causes microcontroller 18 to jump immediately into a special interrupt routine indicated by process block 80 in FIG. 5.

In general the NMI routine saves the status of microcontroller 18, jumps to a section of the start up routine that information in a location accessible to the host and stores the pre-routine status of the microcontroller and then returns to operating in the main code at the point where it left off.

Figure 6:
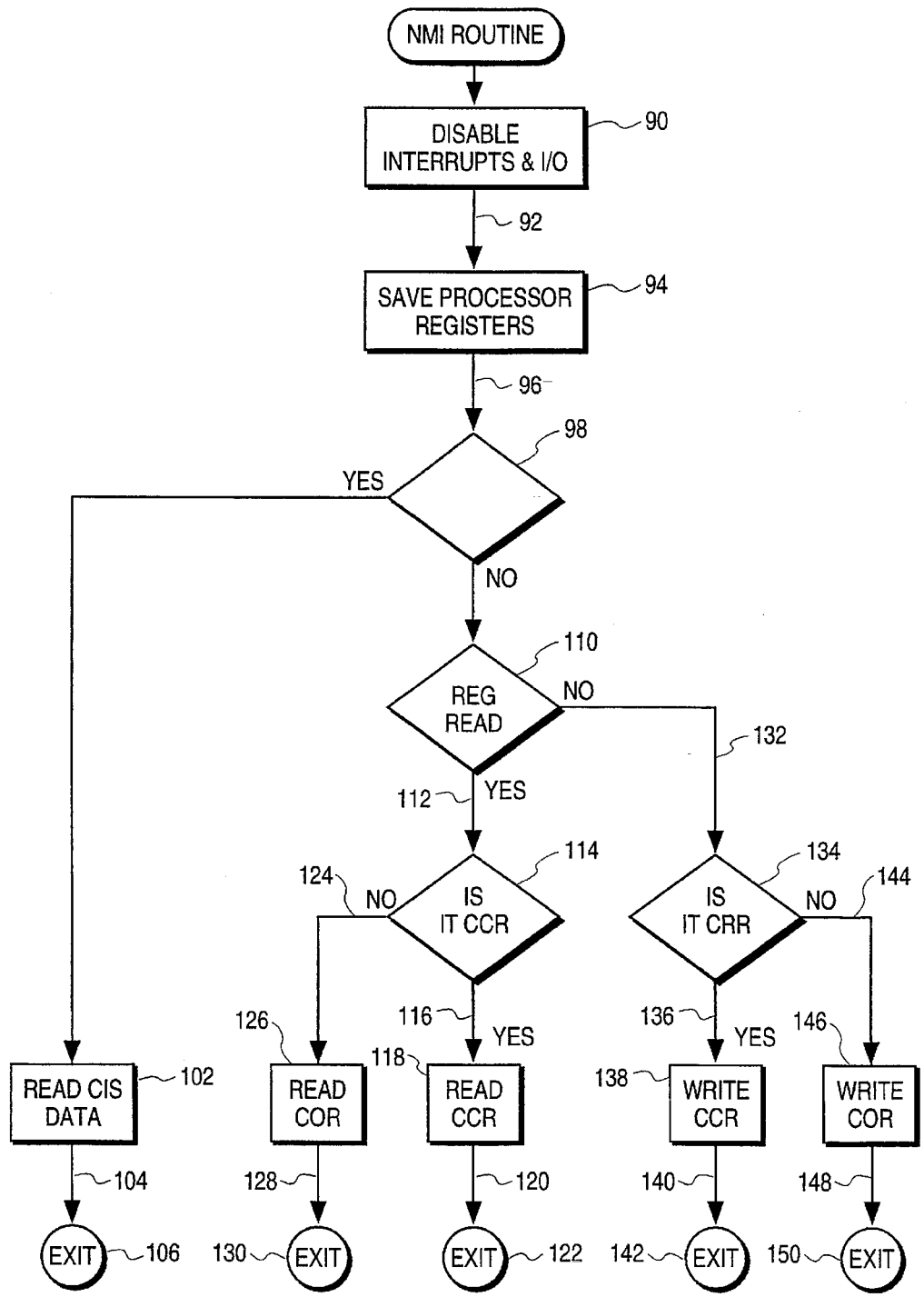
FIG. 6 is a detailed flow chart of a portion of the present invention.

FIG. 6 is a more detailed flow chart of the NMI interrupt routine of the present invention. Referring now to FIG. 6, the first step is to disable the I/O interface and all interrupts of microcontroller 18 which is illustrated as process block 90. This puts microcontroller 18 in an idle mode and able to devote all of its resources to reading or writing to CIS information located in attribute memory 22 within the 12 microseconds specified by the PCMCIA standard.

From processing block 90, follow process path 92 to process block 94 where all of the registers of microcontroller 18 are saved. This is required since at the end of the NMI routine, microcontroller 18 will be returned to the point in main code where is was operating prior to the NMI. The data saved from the registers of microcontroller 18 will then be restored, and operation will continue as if the NMI had not occurred.

From processing block 94, follow process path 96 to decision block 98. In decision block 98, address bit 9 is checked to see if the access is to CIS or COR-CCR. In particular, if the address is 0 to IFF h then address bit 9=0. However, if the address is 200 to 3FF h, then address bit 9=1.

If the decision in block 98 is yes, follow process path 100 to processing block 102 where one byte of data is read from the CIS and supplied to the host computer. From process block 102, follow process path 104 to exit 106. At exit 106, control of microcontroller 18 returns to the main code 74 as illustrated in FIG. 5. So far the NMI routine has allowed the host to read CIS information during normal operation of card 12.

If the decision in block 98 is no, this means that the NMI was triggered to access either the COR or the CCR registers. In this case, follow process path 108 to decision block 110. At decision block 110, determine if the request is a read. The read request by the host would typically be for purposes of determining if the Audio/CEN/RE bits are set. If yes, it is a read and follow process path 112 to decision block 114. In decision block 114 determine if the request is for a read of the CCR register. If yes, follow process path 116 to processing block 118 which reads the CCR. The host would typically request a read of CCR for the purpose of checking the status of the Audio enable bit or the ring enable bit. From processing block 118 follow process path 120 to exit 122. At exit 122, control of microcontroller 18 returns to the main code 74 as illustrated in FIG. 5. The host would typically request a read of COR for the purpose of checking the status of CEN.

If the decision at block 114 is no, follow process path 124 to processing block 126 which reads the COR register. From processing block 126 follow process path 128 to exit 130. At exit 130, control of microcontroller 18 returns to the main code as illustrated in FIG. 5.

If the decision at block 110 is no, then the request is a write rather than a read. In this case, follow process path 132 to decision block 134. In decision block 134, determine if it is the CCR that the host wishes to write to. If yes, follow process path 136 to processing block 138 where the data supplied by the host is written to the CCR. The host would typically request a write of CCR for the purpose of configuring the Audio/RE bits. From process block 138, follow process path 140 to exit 142. At exit 142, control of microcontroller 18 returns to the main code 74 as illustrated in FIG. 5. If the decision in block 134 is no, then the access is a write to the COR. Accordingly, follow process path 144 to processing block 146 where data supplied by the host is written to the COR. The host would typically request a write to the COR for the purpose of resetting the modem via bit 8 or setting/resetting the CEN. From process block 146, follow process path 148 to connecting symbol B.

Figure 7:
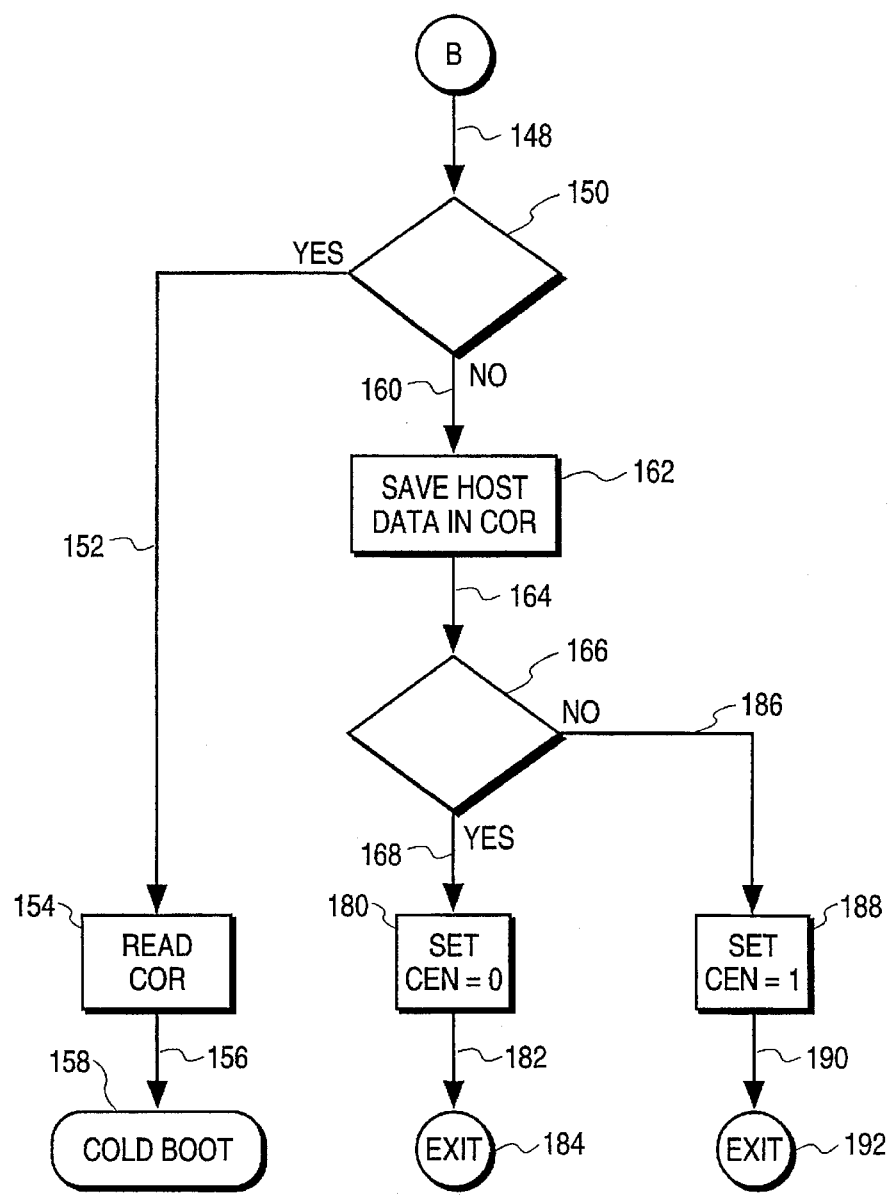
FIG. 7 is a continuation of the flow chart of FIG. 6.

FIG. 7 is a block diagram that picks up form the block diagram of FIG. 6 at connecting symbol B. Referring now to FIG. 7, follow process path 148 to decision block 150. In decision block 150, determine the status of the Reset bit and if not reset, process the CEN bit. If yes, follow process path 152 to processing block 154 and read the contents of the COR to the host. The effect of this action is to properly terminate the NMI function caused by the host and cause the WAIT# signal to return to normal. From process block 154, follow process path 156 to process block 158 which calls for a cold boot. At this stage of the process, a cold boot is required because the host requested a Reset and the cold boot routine resets the modem to an unconfigured state.

If the decision in decision block 150 is no, follow process path 160 to process block 162 and save the host data into the COR. The effect of this action is to reflect the bits the host has set in the COR register. Once the host data is saved to the COR, follow process path 164 to decision block 166. Decision block tests to see if the COR is zero. If yes, this means that the host 10 and PC card 12 are configured. Thus, follow process path 168 to process block 180. In process block 180, a signal called the CEN is disabled. The CEN signal is a single bit in the preferred embodiment. It is generated by microcontroller 18 and supplied to a specified microcontroller pin in response to software command. Disabling the CEN bit means insuring that there is a zero voltage on the specified microcontroller pin. The use of this signal will be described more fully in connection with FIG. 8. After CEN has been disabled, follow process path 182 to exit 184. At exit 184, control of microcontroller 18 returns to the main code 74 as illustrated in FIG. 5. If the decision in decision block 166 is no, follow process path 186 to process block 188. In process block 188, the CEN is enabled. That is a logic 1 voltage is supplied to the appropriate output pin. After enabling CEN, follow process path 190 to exit 192. At exit 192, control of microcontroller 18 returns to the main code 74 as illustrated in FIG. 5.

Figure 8:
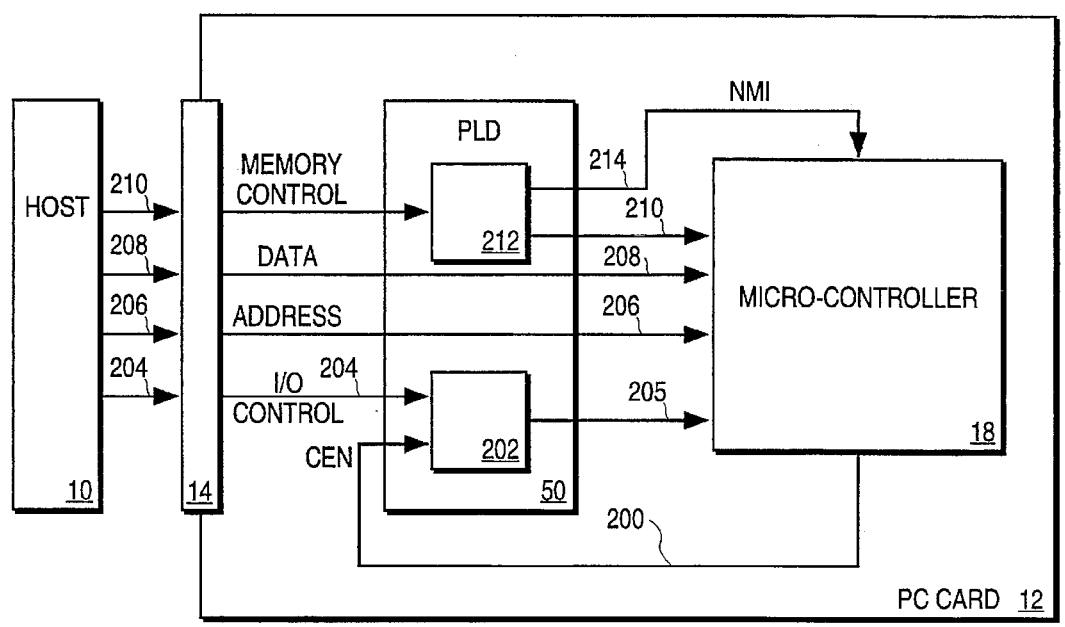
FIG. 8 is a block diagram of the architectural aspects of the interrupt and I/O disconnect portions of the invention.

FIG. 8 is a simplified block diagram of the host and PC card architecture according to one aspect of the invention. Referring now to FIG. 8, a CEN bit output pin from microcontroller 18 is connected through data path 200 to gate 202 in PLD 50. I/O control signals from host 10 pass along data path 204 through connector 14 to gate 202 in PLD 50 and from gate 202 via data path 205 to microcontroller 18. If the host's microprocessor enables these signals while putting an address on address bus 206, the memory locations in I/O space 26 on card 12 will be addressed. The PCMCIA standard for I/O devices requires that the I/O section of any PC card performing I/O functions be disabled until it is configured. This is accomplished according to one aspect of the invention by use of the CEN bit. Gate 202 operates to pass the I/O control signals through to microcontroller 18 only when the CEN bit is asserted. As described in connection with FIGS. 6 and 7, the CEN bit is asserted only after the host computer 10 has specified that the system is configured by writing a non-zero value into COR. Prior to this event, gate 202 prevents I/O control signals from reaching microcontroller 18. This means that the I/O section of microcontroller 18 cannot be accessed by host 10. And since the I/O functionality of card 12 is located in the I/O memory space 26 of memory 20, the I/O functions of card 12 are effectively disabled.

Both attribute memory 22 and common memory 24 control signals are supplied from host 10 along data path 210 through connector 14 to decoder 212 in PLD 50. Decoder 212 detects the memory control signals while passing them through to microcontroller 18. When decoder 212 detects an access to attribute memory, it generates a NMI signal which is supplied along data path 214 to microcontroller 18. Upon receiving a NMI signal, microcontroller executes the NMI routine as described in connection with FIGS. 6 and 7 and supplies CIS information to host 10.

What is claimed is:

1. In a method of accessing memory located on a Personal Computer Memory Card International Association (PCMCIA) card within a host computer, said PCMCIA card comprising a PCMCIA bus, attribute memory, common memory and I/O space and operating under the control of a microcontroller on said PCMCIA card to perform at least one I/O function, wherein said microcontroller contains registers, and wherein said PCMCIA card has a configured and unconfigured state, and wherein said host includes a bus having address, data and control lines connected through an interface to said PCMCIA card bus, and wherein logic circuitry is provided on said PCMCIA card for monitoring said PCMCIA card bus, decoding said PCMCIA card bus signals and generating non-maskable interrupts as a result thereof, which interrupts are supplied to said microcontroller, said method comprising the following steps:

decoding said PCMCIA card bus signals to determine when said host has made a request for access to attribute memory;

generating a non-maskable interrupt when said attribute memory access is detected;

running an interrupt routine located in said memory wherein said interrupt routine comprises the following steps:

disconnecting said I/O function of said PCMCIA card from said host; saving said registers of said microcontroller; performing said access to attribute memory requested by said host; providing the results of said attribute memory access to said host; testing to determine if said PCMCIA card has been configured;

if said test indicates that said PCMCIA card is configured, reconnect said I/O function of said PCMCIA card to said host; and return control of said microcontroller to the location in code from which it was taken upon the occurrence of said interrupt.

2. The method of claim 1 wherein said PCMCIA card contains configuration information structure (CIS) information in said attribute memory.

3. The method of claim 2 wherein said bus signals to be decoded are said control signals.

4. A computer system comprising:

a host computer having a host bus with address, data and control lines;

a personal computer (PC) card having a PC card bus and microcontroller with associated memory, said memory being divided into at least a first section storing a startup routine and configuration information for said PC card and a second section storing I/O information used to perform at least one I/O function for said host, and wherein said startup routine and configuration are not available to said host through software commands alone after said startup routine has been completed;

an interface for connecting said host bus to said PC card bus;

logic on said PC card connected to and monitoring signals on said PC card bus and supplying an interrupt signal to said microcontroller upon decoding memory access commands from said host that request information stored in said first section of memory; and means in said microcontroller responsive to said interrupt signal for supplying said startup routine and configuration information stored in said first section of memory to said host computer.

5. The system of claim 4 wherein said means in said microcontroller responsive to said interrupt signal for supplying said information stored in said first section of memory to said host computer comprises an interrupt routine running instructions stored in said memory.

6. The system of claim 5 wherein said interface operates under a signal protocol and wherein said signal protocol management for said PC card is performed by said microcontroller.

7. The system of claim 6 further characterized by logic circuitry connected between said PC card bus and said microcontroller for disconnecting said I/O functions of said PC card from said host if said host has not read said configuration information from said first section of memory and has not completed said startup routine by allocating system resources necessary to perform said I/O function.

8. The system of claim 7 wherein said logic circuitry connected between said PC card bus and said microcontroller comprises:

circuitry having as a first input connected to said control lines of said PC card bus relating to I/O space, an output connected to said microcontroller, and a second input connected to said microprocessor for receiving a signal having at least two logic states, said circuitry adapted to cause signals on said control lines of said PC card bus to be passed through to said microcontroller when said second input signal is in a first state and not passed to said microcontroller when said second input signal is in other than said first state.

* * * * *